United States Patent
Kato et al.

(10) Patent No.: US 8,822,568 B2
(45) Date of Patent: Sep. 2, 2014

(54) BINDER COMPOSITION FOR SELF-CURING MOLD FORMATION

(75) Inventors: Masayuki Kato, Toyohashi (JP); Toshiki Matsuo, Toyohashi (JP); Tomofumi Kanzawa, Toyohashi (JP); Takashi Joke, Toyohashi (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 13/519,078

(22) PCT Filed: Dec. 17, 2010

(86) PCT No.: PCT/JP2010/072779
§ 371 (c)(1),
(2), (4) Date: Jun. 25, 2012

(87) PCT Pub. No.: WO2011/078082
PCT Pub. Date: Jun. 30, 2011

(65) Prior Publication Data
US 2012/0289651 A1    Nov. 15, 2012

(30) Foreign Application Priority Data
Dec. 25, 2009   (JP) .................................. 2009-295711

(51) Int. Cl.
| | | |
|---|---|---|
| B22C 1/00 | (2006.01) | |
| B22C 1/22 | (2006.01) | |
| C08L 71/14 | (2006.01) | |
| C09J 161/00 | (2006.01) | |

(52) U.S. Cl.
CPC .............. C08L 71/14 (2013.01); B22C 1/2246 (2013.01); C09J 161/00 (2013.01); B22C 1/224 (2013.01)
USPC ....................................................... 523/139

(58) Field of Classification Search
USPC ........................................................ 523/139
See application file for complete search history.

(56) References Cited

U.S. PATENT DOCUMENTS

| | | | |
|---|---|---|---|
| 3,793,286 A | | 2/1974 | Petersen et al. |
| 4,143,022 A | * | 3/1979 | Iyer ............................... 523/139 |
| 4,176,114 A | * | 11/1979 | Stewart et al. ................. 523/144 |
| 5,491,180 A | * | 2/1996 | Kiuchi et al. .................. 523/139 |
| 5,932,628 A | | 8/1999 | Kiuchi et al. |
| 2003/0036583 A1 | * | 2/2003 | Chang ........................... 523/139 |

FOREIGN PATENT DOCUMENTS

| | | |
|---|---|---|
| CN | 1117514 A | 2/1996 |
| JP | 48-56520 A | 8/1973 |
| JP | 8-57576 A | 3/1996 |
| JP | 8-57577 A | 3/1996 |
| JP | 2000-246391 A | 9/2000 |
| JP | 2007-326122 A | 12/2007 |
| JP | 2009-269062 A | 11/2009 |

OTHER PUBLICATIONS

International Preliminary Report on Patentability and translation of Written Opinion of the International Searching Authority, dated Aug. 23, 2012, for International Application No. PCT/JP2010/072779.
International Search Report issued in PCT/JP2010/072779, mailed Mar. 22, 2011.

* cited by examiner

*Primary Examiner* — Nicole M Buie-Hatcher
*Assistant Examiner* — Chelsea M Lowe
(74) *Attorney, Agent, or Firm* — Birch, Stewart, Kolasch & Birch, LLP

(57) ABSTRACT

A binder composition for self-curing mold formation, comprising at least one condensate (A) selected from furfuryl alcohol condensate and furfuryl alcohol/formaldehyde condensate, and an acid-curable resin (B), wherein about the condensate(s) (A), the presence ratio by mole of its/their furan rings (a) to the total of its/their methylol groups (b), methylene groups (c) and oxymethylene groups (d), a:(b+c+d), is from 1:1.00 to 1:1.08, and the content by percentage of the at least one condensate (A) is from 0.3 to 8.0% by weight.

16 Claims, No Drawings

BINDER COMPOSITION FOR SELF-CURING MOLD FORMATION

TECHNICAL FIELD

The present invention relates to a binder composition for self-curing mold formation; and a method for producing a mold, using this composition.

BACKGROUND ART

An acid-curable self-curing mold is produced by adding, to refractory particles made of silica sand or the like, a binder for self-curing mold formation that contains an acid-curable resin such as a furan resin, and a curing agent containing phosphoric acid, an organic sulfonic acid, sulfuric acid or the like, mixing these components with each other, filling the resultant mixed sands into an original pattern such as a wooden pattern, and then curing the acid-curing resin.

Examples of a resin usable as the furan resin include furfuryl alcohol, furfuryl alcohol/urea-formaldehyde resin, furfuryl alcohol/formaldehyde resin, furfuryl alcohol/phenol/formaldehyde resin, and other known modified furan resins. For example, Patent Documents 1 to 6 each discloses a binder composition for self-curing mold formation that contains a furan resin obtained by polycondensing furfuryl alcohol and an aldehyde as main components.

PRIOR ART DOCUMENTS

Patent Documents
Patent Document 1: JP-A-2000-246391
Patent Document 2: JP-A-8-57576
Patent Document 3: JP-A-8-57577
Patent Document 4: JP-A-2007-326122
Patent Document 5: JP-A-2009-269062
Patent Document 6: U.S. Pat. No. 3,793,286

SUMMARY OF THE INVENTION

Problems to be Solved by the Invention

A requirement for improving the productivity of acid-curable self-curing molds is that mixed sands therefor should be made high the in depths curability. The depths curability means the curability of a site of mixed sands that does not contact, when the mixed sands are filled into an original pattern, the outside air (the site being a site that does not contact the original pattern). About acid-curable resins, the curing reaction thereof is advanced by dehydration condensation reaction; thus, the depths of any mold, which are not exposed to the outside air, are slowly cured since water from the reaction is not easily taken away. Usually, the depths of the mold are regions contacting an original pattern, such as a wooden pattern, and are most important. For this reason, a binder therefor has been required not only to be fast in curing speed but also to have the good depths curability that makes it possible to cure the depths of the mold sufficiently.

However, when the binder compositions of Patent Documents 1 to 6 are each used to produce a mold, the strength and the depths curability of the mold are not sufficient. Dependently on conditions, the curing of the mold depths becomes late when the mold is taken out. Thus, it is difficult that the binder compositions make an improvement in the productivity (of molds).

The present invention provides a binder composition for self-curing mold formation that makes an improvement in the strength of the mold, and the depths curability of the mold; and a method for producing a mold, using this composition.

Means for Solving the Problems

The binder composition of the present invention is a binder composition for self-curing mold formation, comprising at least one condensate (A) selected from furfuryl alcohol condensate and furfuryl alcohol/formaldehyde condensate, and an acid-curable resin (B), wherein about the at least one condensate (A), the presence ratio by mole of its/their furan rings (a) to the total of its/their methylol groups (b), methylene groups (c) and oxymethylene groups (d), a:(b+c+d), is from 1:1.00 to 1:1.08, and the content by percentage of the at least one condensate (A) is from 0.3 to 8.0% by weight.

The method of the present invention is a method for producing a mold, comprising the step of curing a mixture of the binder composition for self-curing mold formation of the present invention, refractory particles, and a curing agent.

Effects of the Invention

According to the binder composition of the present invention for the formation of a self-curing mold, the strength and the depths curability of the mold can be improved. Moreover, according to the method for producing a mold of the present invention, the strength and the depths curability of the resultant mold can be improved. As a result, the productivity of molds can be improved.

EMBODIMENTS FOR CARRYING OUT THE INVENTION

The binder composition of the present invention for self-curing mold formation (referred to merely as the "binder composition" hereinafter) contains at least one condensate (A) selected from furfuryl alcohol condensate, and furfuryl alcohol/formaldehyde condensate, and an acid-curable resin (B). The at least one condensate (A) (each) has/have a structure that will be described later. Hereinafter, the components contained in the binder composition of the present invention will be described.

<Condensate (A)>

The binder composition of the present invention contains at least one condensate (A) selected from furfuryl alcohol condensate, and furfuryl alcohol/formaldehyde condensate. About the one condensate (A), or each of the condensates (A), the presence ratio by mole of its furan rings (a) to the total of its methylol groups (b), methylene groups (c) and oxymethylene groups (d), a:(b+c+d), is from 1:1.00 to 1:1.08, preferably from 1:1.00 to 1:1.05, more preferably from 1:1.00 from the viewpoint of the depths curability of the mold. The reason why the use of the condensate (A) improves the binder composition in depths curability is unclear; however, it is presumed that by setting the presence ratio between the individual functional groups into the above-mentioned range, the hydrophobicity of the condensate (A) is made high so that reaction water is easily removed to promote the curing reaction of the depths of the mold. Furfuryl alcohol is not included in the category of the condensate (A).

The presence ratio (by mole) can be measured by a quantitative integration method (inverse gate decoupling method) according to 13C-NMR. Specifically, the concentration of a sample is set to 20% by weight in a solution wherein a solvent is deuterium chloroform, and an integral is made 20000 times under a condition that nuclear Overhauser effect is removed, thereby measuring the ratio. About the resultant peaks, it is concluded that a half of the area at a peak at 104 to 115 ppm is assigned to the furan rings (a), the area of a peak at 56 to 60 ppm to the methylol groups (b), that of a peak at 25 to 30 ppm to the methylene groups (c), and that of a peak at 62 to 65 ppm to the oxymethylene groups (d), and then the ratio between the individual areas is calculated. In this way, the presence ratio is calculated. At this time, furfuryl alcohol (the monomer remaining after the synthesis) in the sample is quantitatively determined by gas chromatography, and the calculation is made under a condition that the area originating from furfuryl alcohol is excluded from each of the above-mentioned peak areas. When the sample contains components other than furfuryl alcohol condensates, furfuryl alcohol/formaldehyde condensates, and furfuryl alcohol, each of the components is appropriately separated and identified by a liquid-liquid separating operation by use of a solvent or the like, chromatography, or some other technique, and then the component is analyzed by the above-mentioned 13C-NMR technique. In this way, the presence ratio can be gained.

In order to control the presence ratio [a:(b+c+d)] into the above-mentioned range, formaldehyde and furfuryl alcohol used when the at least one condensate (A) is synthesized are caused to react with each other preferably under a condition that the ratio by mole of formaldehyde to furfuryl alcohol is preferably from 0.00:1 to 0.08:1, more preferably from 0.00:1 to 0.05:1, even more preferably from 0.00:1 to 0.03:1. Even more preferably, furfuryl alcohol alone is polymerized. When furfuryl alcohol alone is polymerized, a furfuryl alcohol condensate, which is one of the furfuryl alcohol condensates, which will be detailed below, is obtained.

The furfuryl alcohol condensates are each obtained by mixing furfuryl alcohol with an acid catalyst, and causing these components to react with each other. Usable examples of the acid catalyst include inorganic acids such as hydrochloric acid, sulfuric acid, phosphoric acid, condensed phosphoric acid, and the like; sulfonic acids such as benzenesulfonic acid, p-toluenesulfonic acid, xylenesulfonic acid, methanesulfonic acid and the like; and organic carboxylic acids such as glutaric acid, succinic acid, acetic acid, oxalic acid, lactic acid, malic acid, benzoic acid, gallic acid, glycolic acid, and the like. The acid catalyst is preferably an inorganic acid, which is a stronger acid, in order to shorten the period for producing the condensate. In order to decrease the amount of harmful gas generated at the time of producing a casting, or prevent a harmful element from invading the casting, the acid catalyst is preferably an organic carboxylic acid.

In the reaction, the ratio by mole of furfuryl alcohol to the acid catalyst is from 1:0.0001 to 1:1.0, more preferably from 1:0.001 to 1:0.1, even more preferably from 1:0.005 to 1:0.05 in order to improve the strength of the mold, and shorten the production period thereof. As one of the furfuryl alcohol condensates, a commercially available product of difurfuryl ether or some other may be used.

The furfuryl alcohol/formaldehyde condensates are each yielded by mixing furfuryl alcohol, formaldehyde, and an acid catalyst with each other and then causing these components to react with each other. The acid catalyst may be identical with the acid catalyst when the above-mentioned furfuryl alcohol condensates are each synthesized. The ratio by mole of the total of furfuryl alcohol and formaldehyde to the acid catalyst in the reaction is preferably from 1:0.0001 to 1:1.0, more preferably from 1:0.001 to 1:0.1, even more preferably from 1:0.005 to 1:0.05 in order to improve the strength of the mold, and shorten the production period thereof.

The weight-average molecular weight of the condensate (A) is preferably from 200 to 5000, more preferably from 250 to 3000, even more preferably from 300 to 1000 from the viewpoint of an improvement in the depths curability, and the viscosity of the binder composition. The weight-average molecular weight of the condensate (A) is calculated under a condition that a peak of an unreacted fragment of furfuryl alcohol is excluded. A specific example of the method for measuring the molecular weight will be disclosed in working examples that will be described later.

In the binder composition, the content by percentage of the at least one condensate (A) is 0.3% or more by weight, preferably 0.5% or more by weight, more preferably 1.0% or more by weight, even more preferably 1.3% or more by weight, even more preferably 1.5% or more by weight from the viewpoint of the depths curability of the mold. In order to improve the final strength of the mold, the content by percentage of the at least one condensate (A) in the binder composition is 8.0% or less by weight, preferably 5.0% or less by weight, more preferably 4.5% or less by weight, even more preferably 4.0% or less by weight. Considering the above-mentioned viewpoints totally, the content by percentage of the at least one condensate (A) in the binder composition is from 0.3 to 8.0% by weight, preferably from 0.5 to 5.0% by weight, more preferably from 1.0 to 4.5% by weight, even more preferably from 1.3 to 4.0% by weight, even more preferably from 1.5 to 4.0% by weight.

<Acid-Curable Resin (B)>

The acid-curable resin (B) may be an acid-curable resin known in the prior art as far as the resin does not satisfy the requirement [a:(b+c+d)=1:1.00 to 1.08] of the at least one condensate (A), and may be one selected from the group consisting of furfuryl alcohol, condensates each made from furfuryl alcohol and an aldehyde, condensates each made from a phenolic compound and an aldehyde, condensates each made from melamine and an aldehyde, and condensates each made from urea and an aldehyde, or a mixture of two or more selected from the group. The acid-curable resin (B) may be a co-condensate of two or more selected from the group; or a mixture of one or more selected from the group, and the co-condensate. From the viewpoint of the depths curability, and the viscosity of the resin, the following out of these substances is preferred: a furan resin comprising one selected from the group consisting of condensates each made from furfuryl alcohol, a phenolic compound, and an aldehyde, condensates each made from furfuryl alcohol, melamine, and an aldehyde, and condensates each made from furfuryl alcohol, urea and an aldehyde; or a furan resin comprising a mixture of two or more selected from the group. Preferred is also a condensate made from furfuryl alcohol, urea and an aldehyde in order to decrease the amount of formaldehyde generated when a mold is formed, and improve the strength of the mold. Furthermore, furfuryl alcohol is preferred in order to adjust the viscosity of the binder composition into an appropriate range. Furfuryl alcohol is handled as the acid-curable resin (B).

Examples of the above-mentioned aldehyde include formaldehyde, acetaldehyde, glyoxal, furfural, terephthalaldehyde or the like. One or more of these aldehydes may be appropriately used. In order to improve the mold strength, formaldehyde is preferred. In order to decrease the amount of formaldehyde generated when a mold is formed, furfural or terephthalaldehyde is preferred.

Examples of the above-mentioned phenolic compound include phenol, cresol, resorcin, bisphenol A, bisphenol C, bisphenol E, bisphenol F or the like. One or more of these examples may be used.

In the case of producing a condensate made from furfuryl alcohol and the aldehyde, it is preferred to use 0.01 to 1 mole of the aldehyde per mole of furfuryl alcohol. In the case of producing a condensate made from the phenolic compound and the aldehyde, it is preferred to use 1 to 3 moles of the aldehyde per mole of the phenolic compound. In the case of producing a condensate made from melamine and the aldehyde, it is preferred to use 1 to 3 moles of the aldehyde per mole of melamine. In the case of producing a condensate made from urea and the aldehyde, the aldehyde is used in an amount preferably from 1.0 to 2.0 moles, more preferably from 1.5 to 2.0 moles, even more preferably from 1.7 to 2.0 moles per mole of urea.

In the case of producing a condensate made from furfuryl alcohol, the aldehyde, and urea, it is preferred to condense furfuryl alcohol, urea and the aldehyde in the presence of an acid catalyst. It is preferred to use 0.05 to 3 moles of the aldehyde, and 0.03 to 1.5 moles of urea per mole of furfuryl alcohol.

The content by percentage of the acid-curable resin (B) in the binder composition is preferably from 50 to 98% by weight, more preferably from 80 to 97% by weight, even more preferably from 90 to 96% by weight to improve the final strength of the mold.

When the acid-curable resin (B) contains, in particular, furfuryl alcohol, the content by percentage of furfuryl alcohol in the binder composition is preferably from 50 to 98% by weight, more preferably from 60 to 90% by weight, even more preferably from 70 to 85% by weight to adjust the viscosity of the binder composition into an appropriate range.

About a self-curing mold, just after refractory particles, the binder composition, and the curing agent are mixed with each other in a mixer, reaction is started therebetween. Thus, it is preferred that the viscosity of the binder composition is low. From this viewpoint, the viscosity of the binder composition is preferably from 1 to 80 mPa·s, more preferably from 5 to 60 mPa·s, even more preferably from 8 to 40 mPa·s, the viscosity being measured at 25° C. with an E-type viscometer.

In the binder composition of the present invention, it appears that crosslinkage bonds are formed between amino groups such as urea and the resin component. It is presumed that the bonds produce a good effect onto the flexibility of the resultant mold. The content by percentage of the amino groups therein can be estimated from the nitrogen content by percentage (% by weight) therein. When the mold is taken from the original mold, the flexibility of the mold is required. In the case of forming a mold having a complicated shape, the mold can be prevented from being cracked when the flexibility of the mold is high, the cracking being caused by the concentration of stress onto a thin region of the mold when the mold is taken out. In the binder composition of the present invention, the nitrogen content by percentage in the binder composition is preferably 0.8% or more by weight, more preferably 1.8% or more by weight, even more preferably 2.2% or more by weight, even more preferably 2.3% or more by weight, even more preferably 2.5% or more by weight to improve the final mold strength. In order to prevent the resultant mold from being cracked, the nitrogen content by percentage in the binder composition is preferably 3.5% or less by weight, more preferably 3.4% or less by weight, even preferably 3.3% or less by weight, even more preferably 3.2% or less by weight. Considering the above-mentioned viewpoints totally, the nitrogen content by percentage in the binder composition is preferably from 0.8 to 3.5% by weight, more preferably from 1.8 to 3.5% by weight, even more preferably from 2.2 to 3.4% by weight, even more preferably from 2.3 to 3.3% by weight, even more preferably from 2.5 to 3.2% by weight. In order to adjust the nitrogen content by percentage in the binder composition into the above-mentioned range, it is advisable to adjust the content by percentage of the nitrogen-containing compound(s) in the binder composition. The nitrogen-containing compound(s) is/are preferably, for example, urea, melamine, any condensate made from urea and an aldehyde, any condensate made from melamine and an aldehyde, any urea resin, any urea modified resin or the like. The nitrogen content by percentage in the binder composition may be quantitatively determined by the Kjeldahl method. Furthermore, the content by percentage of nitrogen originating from the following may be gained by determining a carbonyl group (C=O group) originating from urea by 13C-NMR: urea, any urea resin, furfuryl alcohol/any urea resin (any urea-modified resin), and furfuryl alcohol/any urea-formaldehyde resin.

<Curing Promoter>

The binder composition of the present invention may contain a curing promoter in order to prevent the mold from being cracked and improve the final strength of the mold. The curing promoter is preferably at least one selected from a curing promoter represented by a general formula (1) illustrated below (hereinafter referred to as the curing promoter (1)), phenol derivatives, and aromatic dialdehydes, and tannin compounds to improve the final mold strength.

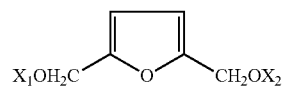

[Formula 1]

In the formula, $X_1$ and $X_2$ each independently represent a hydrogen atom, $CH_3$ or $C_2H_5$.

Examples of the curing promoter (1) include 2,5-bishydroxymethylfuran, 2,5-bismethoxymethylfuran, 2,5-bisethoxymethylfuran, 2-hydroxymethyl-5-methoxymethylfuran, 2-hydroxymethyl-5-ethoxymethylfuran, and 2-methoxymethyl-5-ethoxymethylfuran. In order to improve the final mold strength, it is preferred to use 2,5-bishydroxymethylfuran. The content by percentage of the curing promoter (1) in the binder composition is preferably from 0.5 to 63% by weight, more preferably from 1.8 to 50% by weight, even more preferably from 2.5 to 50% by weight, even more preferably from 3.0 to 40% by weight from the viewpoint of the solubility of the curing promoter (1) in the acid-curable resin (B), and an improvement in the final mold strength.

Examples of the phenol derivatives include resorcin, cresol, hydroquinone, phlorogulcinol, methylenebisphenol or the like. Of these examples, resorcin is particularly preferred from the viewpoint of the performance of curing the depths of the mold, and an improvement in the final strength of the mold. The content by percentage of one or more of the phenol derivatives in the binder composition is preferably from 1 to 25% by weight, more preferably from 2 to 15% by weight, even more preferably from 3 to 10% by weight from the viewpoint of the solubility of the phenol derivative(s) in the acid-curable resin (B), and an improvement in the final mold strength. In the case of using, in particular, resorcin, the content by percentage of resorcin in the acid-curable resin (B) is preferably from 1 to 10% by weight, more preferably from 2 to 7% by weight, even more preferably from 3 to 6% by weight from the viewpoint of the solubility of resorcin in the binder composition, the performance of curing the depths of the mold, and the final strength of the mold.

Examples of the aromatic dialdehydes include terephthalaldehyde, phthalaldehyde, isophthalaldehyde or the like, or derivatives thereof or the like. The derivatives mean compounds that are each an aromatic compound having, as a basic skeleton thereof, an aromatic ring that has two formyl groups, and further having, in the ring, a substituent such as an alkyl group. In order to prevent the mold from being cracked, preferred are terephthalaldehyde and terephthalaldehyde derivatives, and more preferred is terephthalaldehyde. The content by percentage of one or more of the aromatic dialdehydes in the binder composition is preferably from 0.1 to 15% by weight, more preferably from 0.5 to 10% by weight, even more preferably from 1 to 5% by weight from the viewpoint of a sufficient dissolution of the aromatic dialdehyde(s) into the acid-curable resin (B), and a restraint of odors of the aromatic dialdehyde(s) itself/themselves.

Examples of the tannin compounds include condensed tannin, and hydrolyzed tannin. Examples of the condensed tannin and the hydrolyzed tannin include tannin having a pyrogallol skeleton, and tannin having a resorcin skeleton. It is allowable to add, to the composition, a tannin-containing bark extract, or a tannin-containing extract from a natural product, examples of the product including leaves, fruits or nuts, seeds originating from a plant, insect galls that are parasitic to a plant or the like.

<Water>

The binder composition of the present invention may contain water. In the case of synthesizing, for example, a condensate that may be of various types, such as a condensate made from furfuryl alcohol and an aldehyde, raw materials in an aqueous solution form are used or condensation water is generated. Thus, the condensate is usually yielded in the form of a mixture with water. When this condensate is used for a binder composition, it is unnecessary to dare to remove these water species originating from the synthesis process. In order to adjust the binder composition into a viscosity permitting the composition to be easily handled, or attain some other purpose, water may be further added thereto. However, if the water amount becomes excessive, it is feared that the curing reaction of the acid-curable resin (B) is hindered. Thus, the water content by percentage in the binder composition ranges preferably from 0.5 to 30% by weight. In order to make the binder composition easy to handle, and keep the rate of the curing reaction, the content by percentage ranges more preferably from 1 to 10% by weight, even more preferably from 3 to 7% by weight. In order to improve the final mold strength, the content by percentage is set preferably to 10% or less by weight, more preferably to 7% or less by weight, even more preferably 4% or less by weight.

<Other Additives>

The binder composition may contain additives such as a silane coupling agent. When the composition contains, for example, a silane coupling agent, the final mold strength can be favorably improved. Usable examples of the silane coupling agent include aminosilanes such as N-β(aminoethyl)γ-aminopropylmethyldimethoxysilane, N-β(aminoethyl)γ-aminopropyltrimethoxysilane, N-β(aminoethyl)γ-aminopropyltriethoxysilane, 3-aminopropyltrimethoxysilane and the like; epoxysilanes such as 3-glycidoxypropyltrimethoxysilane, 3-glycidoxypropyltriethoxysilane, 3-glycidoxypropylmethyldiethoxysilane, 3-glycidoxypropyltriethoxysilane and the like; ureidosilanes; mercaptosilanes; sulfide silanes; methacryloxysilanes; acryloxysilanes and the like. Preferred are aminosialnes, epoxysilanes, or ureidosilanes. The content by percentage of the silane coupling agent in the binder composition is preferably from 0.01 to 0.5% by weight, more preferably from 0.05 to 0.3% by weight to improve the final mold strength.

The binder composition of the present invention is suitable for a method for producing a mold having the step of curing a mixture of refractory particles, the binder composition for self-curing mold formation, and a curing agent. In other words, the method for producing a mold of the present invention is a method for producing a mold wherein the binder composition of the present invention is used as a binder composition for self-curing mold formation.

In the method for producing a mold of the present invention, a mold can be produced, using a process for a method for producing a mold in the prior art as it is. For example, the binder composition of the present invention, and a curing agent for curing this binder composition are added to refractory particles, and these are mixed with each other in a batch mixer, a continuous mixer or some other, whereby the above-mentioned mixture (mixed sands) can be yielded. In the method for producing a mold of the present invention, it is preferred to add the curing agent to the refractory particles, and subsequently add the binder composition of the present invention thereto.

The refractory particles may be refractory particles known in the prior art, such as silica sands, chromite sands, zircon sands, olivine sands, alumina sands, mullite sands, synthetic mullite sands and the like, or may be sands obtained by collecting used refractory particles, sands obtained by subjecting to used refractory particles to regenerating treatment, or other sands.

The curing agent may be one or more curing agents known in the prior art, examples of which include aqueous acidic solutions which each contain the following: a sulfonic acid based compound such as xylenesulfonic acid (in particular, m-xylenesulfonic acid), toluenesulfonic acid (in particular, p-toluenesulfonic acid), methanesulfonic acid and the like; a phosphoric acid based compound such as phosphoric acid, an acidic phosphate and the like; sulfuric acid; or some other. Furthermore, it is allowable to incorporate, into the curing agent, one or more solvents selected from alcohols, ether alcohols and esters, or a carboxylic acid. Of these examples, preferred are alcohols, and ether alcohols to improve the final mold strength, and more preferred are ether alcohols. When the solvent(s) or the carboxylic acid is incorporated into the curing agent, the water content by percentage in the curing agent is decreased so that the final mold strength is further improved. The content by percentage of the solvent(s) or the carboxylic acid in the curing agent is preferably from 5 to 50% by weight, more preferably from 10 to 40% by weight to improve the final mold strength. In order to decrease the viscosity of the curing agent, it is preferred to incorporate methanol or ethanol thereinto.

In order to improve the final mold strength, preferred examples of the alcohols include propanol, butanol, pentanol, hexanol, heptanol, octanol, and benzyl alcohol. Examples of the ether alcohols include ethylene glycol monoethyl ether, ethylene glycol monobutyl ether, ethylene glycol monohexyl ether, diethylene glycol monoethyl ether, diethylene glycol monobutyl ether, diethylene glycol monohexyl ether, diethylene glycol monophenyl ether, and ethylene glycol monophenyl ether. Examples of the esters include butyl acetate, butyl benzoate, ethylene glycol monobutyl ether acetate, and diethylene glycol monobutyl ether acetate. The carboxylic acid is preferably a carboxylic acid having a hydroxyl group, and is more preferably lactic acid, citric acid, or malic acid to improve the final mold strength and decrease odors.

The ratio between the refractory particles, the binder composition and the curing agent in the mixed sands may be appropriately selected. For 100 parts by weight of the refractory particles, the amount of the binder composition and that of the curing agent are preferably from 0.5 to 1.5 parts by weight and from 0.07 to 1 part by weight, respectively. When the ratio is a ratio in this range, a mold having a sufficiently strength can easily be yielded. The content of the curing agent is from 10 to 40 parts by weight, more preferably from 15 to 35 parts by weight, even more preferably from 18 to 25 parts by weight for 100 parts by weight of the acid-curable resin (B) in the binder composition from the viewpoint of a reduction of water contained in the mold to the utmost, and the efficiency of the mixing in the mixer.

EXAMPLES

Hereinafter, a description will be made about working examples demonstrating the present invention specifically, and others. In the working examples, and the others, evaluating items were measured as follows:

<Weight-Average Molecular Weight of any Condensate>

The weight-average molecular weight (of any condensate) was analyzed in terms of standard polystyrene, using a gel permeation chromatograph SC-8020 series/build-up system (columns: G2000HXL+G4000HXL, detector: UV254 nm; carrier: tetrahydrofuran (1 mL/minute); and column temperature: 38° C.) manufactured by Tosoh Corp. At this time, a calculation was made in the state that a peak of an unreacted fragment of furfuryl alcohol was excluded.

<Quantitative Determination of any Condensate>

After the synthesis of any condensate, furfuryl alcohol in the mixture containing the resultant condensate was quantitatively determined by gas chromatography. Furthermore, the amount of water in the mixture was quantitatively determined by Karl Fischer technique, and from the total amount of the mixture, the determined furfuryl alcohol amount and water amount, and the catalyst amount calculated from the charged amount thereof were excluded. The resultant amount was defined as the amount of the condensate.

<Nitrogen Content by Percentage in any Binder Composition>

This quantity was measured by the Kjeldahl method described in JIS M 8813.

<Mold Strength>

Just after the mixing (of any binder composition and others), the resultant mixed sands were put into a cup made of polypropylene and having a diameter of 200 mm and a height of 200 mm. When a mold-taking-out period elapsed, the mold was taken out from the polypropylene cup. A surface hardness meter (manufactured by Nakayama Co., Ltd.) for furan molds was used to measure the surface hardness of the mold upper surface (surface exposed to the outside air), and that of the mold lower surface (surface contacting the bottom surface of the polypropylene cup). The mold-taking-out period denotes a standing-still period obtained by the following: the mixed sands just after the mixing were filled into a test piece frame in the form of a column having a diameter of 50 mm and a height of 50 mm; at 25° C. and a relative humidity of 50%, the test piece frame was allowed to stand still for a predetermined period; the mold was then taken out from the frame; the compressive strength thereof was measured by a method described in JIS Z 2604-1976; after the standing-still of the frame, a measurement was made about a time when the resultant measured value reached 0.8 MPa for the first time after the standing-still; and the standing-still period from the time just after the filling to the measured time was calculated. Any surface hardness value shown in Table 2 is a value of a scale (having no unit) that the surface hardness meter for furan molds indicated.

<Depths Curability>

The upper surface and the lower surface of the mold were measured about their surface hardness, as described above. The ratio of the surface hardness of the lower surface to that of the upper surface was calculated out. This was used as an index of the depth curability (of the binder composition). It was determined that as the ratio of the surface hardness of the lower surface to that of the upper surface was nearer to 1.00, the composition was a binder composition better in depths curability.

<Mold Strength After 24 Hours>

Just after the mixing (of any binder composition and others), the resultant mixed sands were filled into a test piece frame in the form of a column having a diameter of 50 mm and a height of 50 mm. When 5 hours elapsed from the filling, the mold of the mixed sands was taken out therefrom. The mold was allowed to stand still at 25° C. and a relative humidity of 55% for 24 hours, and then the compressive strength thereof was measured by the method described in JIS Z 2604-1976. The resultant measured value was defined as the mold strength after 24 hours.

<Synthesis of a Condensate 1>

Into a three-necked flask were put 100 parts by weight of furfuryl alcohol and 5 parts by weight of glutaric acid (Wako Pure Chemical Industries, Ltd.) (ratio by mole of furfuryl alcohol to glutaric acid=1:0.008). While the mixture was stirred, the temperature thereof was raised to 100° C. Thereafter, at the same temperature, the reactive component was caused to react for 8 hours, thereby yielding a condensate 1. Conditions for the reaction, and others are shown in Table 1.

<Synthesis of a Condensate 2>

Into a three-necked flask were put 100 parts by weight of furfuryl alcohol, 1.7 parts by weight of paraformaldehyde, and 5 parts by weight of glutaric acid (Wako Pure Chemical Industries, Ltd.) (ratio by mole of furfuryl alcohol to formaldehyde to glutaric acid=1:0.05:0.02). The temperature thereof was raised to 100° C. Thereafter, at the same temperature, the reactive components were caused to react for 8 hours, thereby yielding a condensate 2. Conditions for the reaction, and others are shown in Table 1.

<Synthesis of a Condensate 3>

Into a three-necked flask were put 100 parts by weight of furfuryl alcohol, 5 parts by weight of paraformaldehyde, and 5 parts by weight of glutaric acid (Wako Pure Chemical Industries, Ltd.) (ratio by mole of furfuryl alcohol to formaldehyde to glutaric acid=1:0.15:0.02). The temperature thereof was raised to 100° C. Thereafter, at the same temperature, the reactive components were caused to react for 8 hours, thereby yielding a condensate 3. Conditions for the reaction, and others are shown in Table 1.

<Synthesis of Condensates 4 to 1022

Condensates 4 and 5 were each yielded in the same manner as used to yield the condensate 1 except that the reaction period after the raise of the temperature was changed to a period shown in Table 1. A condensate 6 was yielded in the same manner as used to yield the condensate 1 except that the acid catalyst was changed to hydrochloric acid, the ratio by mole of furfuryl alcohol to the acid catalyst was 1:0.0003, and the reaction period after the raise of the temperature was changed to a period shown in Table 1. Condensates 7 to 10 were each yielded in the same manner as used to yield the condensate 1 except that the acid catalyst was changed to an acid shown in Table 1. Conditions for each of the reactions, and others are shown in Table 1.

TABLE 1

|  | Furfuryl alcohol/formaldehyde at the time of synthesis (ratio by mole) | Acid catalyst | Furfuryl alcohol/acid catalyst at the time of synthesis (ratio by mole) | Reaction period after temperature-raise (hours) | a:(b + c + d) (ratio by mole) | Weight-average molecular weight |
|---|---|---|---|---|---|---|
| Condensate 1 | 1:0.00 | Glutaric acid | 1:0.008 | 8 | 1:1.00 | 958 |
| Condensate 2 | 1:0.05 | Glutaric acid | 1:0.02 | 8 | 1:1.05 | 1241 |
| Condensate 3 | 1:0.15 | Glutaric acid | 1:0.02 | 8 | 1:1.15 | 1523 |
| Condensate 4 | 1:0.00 | Glutaric acid | 1:0.008 | 4 | 1:1.00 | 652 |
| Condensate 5 | 1:0.00 | Glutaric acid | 1:0.008 | 12 | 1:1.00 | 1450 |
| Condensate 6 | 1:0.00 | Hydrochloric acid | 1:0.0003 | 2 | 1:1.00 | 1006 |
| Condensate 7 | 1:0.00 | Succinic acid | 1:0.008 | 8 | 1:1.00 | 1020 |
| Condensate 8 | 1:0.00 | Benzoic acid | 1:0.008 | 8 | 1:1.00 | 952 |
| Condensate 9 | 1:0.00 | Glycolic acid | 1:0.008 | 8 | 1:1.00 | 989 |
| Condensate 10 | 1:0.00 | Gallic acid | 1:0.008 | 8 | 1:1.00 | 390 |

Examples 1 to 15, and Comparative Examples 1 to 4

At 25° C. and a relative humidity of 50%, to 100 parts by weight of furan regenerated sands was added 0.36 part by weight of a curing agent [mixture of a curing agent, KAO-LIGHTNER TK-3, manufactured by Kao-Quaker Co., Ltd., and a curing agent, KAO-LIGHTNER F-9, manufactured by Kao-Quaker Co., Ltd. (ratio by weight of TK-3/F-9=23/17)]. Next, thereto was added 0.90 part by weight of each binder composition shown in Table 2, and then these components were mixed with each other to yield mixed sands. About the resultant mixed sands, the above-mentioned respective methods were used to make evaluations about the individual items. The results are shown in Table 2. The used furan regenerated sands were mixed sands about which the loss of ignition (LOI) obtained when the sands were heated in the air at 1000° C. for 1 hour was 1.4% by weight.

TABLE 2

Binder composition (content by percentage of each component: % by weight thereof in binder composition)

|  | Condensate (A) | | Acid-curable resin (B) | | | Curing promoter | |
|  | | | Synthetic resin | | | | |
|  | Species | Content by percentage (% by weight) | Species | Content by percentage (% by weight) | Furfuryl alcohol (% by weight)[1] | Species | Content by percentage (% by weight) |
|---|---|---|---|---|---|---|---|
| Example 1 | Condensate 1 | 1.5 | Furan resin 1 | 24.3 | 74.1 | None | 0.0 |
| Example 2 | Condensate 2 | 1.5 | Furan resin 1 | 24.3 | 74.1 | None | 0.0 |
| Example 3 | Condensate 1 | 3.0 | Furan resin 1 | 24.3 | 72.6 | None | 0.0 |
| Example 4 | Condensate 1 | 4.5 | Furan resin 1 | 24.3 | 71.1 | None | 0.0 |
| Example 5 | Condensate 1 | 1.5 | Furan resin 1 | 24.3 | 69.1 | Resorcin | 5.0 |
| Example 6 | Difurfuryl ether | 1.5 | Furan resin 1 | 24.3 | 74.1 | None | 0.0 |
| Example 7 | Condensate 4 | 1.5 | Furan resin 1 | 24.3 | 74.1 | None | 0.0 |
| Example 8 | Condensate 5 | 1.5 | Furan resin 1 | 24.3 | 74.1 | None | 0.0 |
| Example 9 | Condensate 6 | 1.5 | Furan resin 1 | 24.3 | 69.1 | Resorcin | 5.0 |
| Example 10 | Condensate 7 | 1.5 | Furan resin 1 | 24.3 | 69.1 | Resorcin | 5.0 |
| Example 11 | Condensate 8 | 1.5 | Furan resin 1 | 24.3 | 69.1 | Resorcin | 5.0 |
| Example 12 | Condensate 9 | 1.5 | Furan resin 1 | 24.3 | 69.1 | Resorcin | 5.0 |
| Example 13 | Condensate 10 | 1.5 | Furan resin 1 | 24.3 | 69.1 | Resorcin | 5.0 |
| Example 14 | Condensate 1 | 3.0 | None | 0.0 | 96.9 | None | 0.0 |
| Example 15 | Condensate 1 | 6.0 | Furan resin 1 | 24.3 | 69.6 | None | 0.0 |
| Comparative Example 1 | None | 0.0 | Furan resin 1 | 24.3 | 75.6 | None | 0.0 |
| Comparative Example 2 | Condensate 3[2] | 1.5 | Furan resin 1 | 24.3 | 74.1 | None | 0.0 |
| Comparative Example 3 | None | 1.5 | Furan resin 1 | 24.3 | 69.1 | Resorcin | 5.0 |
| Comparative Example 4 | Condensate 5 | 10.0 | Furan resin 1 | 24.3 | 65.6 | None | 0.0 |

TABLE 2-continued

| | Binder composition (content by percentage of each component: % by weight thereof in binder composition) | | Evaluation of mold | | | |
|---|---|---|---|---|---|---|
| | Silane coupling agent (% by weight) | Nitrogen content by percentage (% by weight) | Mold hardness | | Depths curability (Ratio of lower surface hardness to upper surface hardness) | Mold strength after 24 hours (MPa) |
| | | | Upper surface | Lower surface | | |
| Example 1 | 0.1 | 2.7 | 84 | 47 | 0.56 | 5.30 |
| Example 2 | 0.1 | 2.7 | 85 | 46 | 0.54 | 5.80 |
| Example 3 | 0.1 | 2.7 | 84 | 50 | 0.60 | 5.75 |
| Example 4 | 0.1 | 2.7 | 82 | 49 | 0.60 | 5.45 |
| Example 5 | 0.1 | 2.7 | 86 | 53 | 0.62 | 5.95 |
| Example 6 | 0.1 | 2.7 | 83 | 47 | 0.57 | 5.45 |
| Example 7 | 0.1 | 2.7 | 84 | 50 | 0.60 | 5.52 |
| Example 8 | 0.1 | 2.7 | 83 | 51 | 0.61 | 5.10 |
| Example 9 | 0.1 | 2.7 | 84 | 53 | 0.63 | 6.05 |
| Example 10 | 0.1 | 2.7 | 86 | 54 | 0.63 | 5.65 |
| Example 11 | 0.1 | 2.7 | 87 | 53 | 0.61 | 5.93 |
| Example 12 | 0.1 | 2.7 | 86 | 53 | 0.62 | 5.75 |
| Example 13 | 0.1 | 2.7 | 85 | 54 | 0.64 | 5.99 |
| Example 14 | 0.1 | 0.0 | 88 | 50 | 0.57 | 4.35 |
| Example 15 | 0.1 | 2.7 | 83 | 47 | 0.57 | 4.50 |
| Comparative Example 1 | 0.1 | 2.7 | 84 | 30 | 0.36 | 4.98 |
| Comparative Example 2 | 0.1 | 2.7 | 83 | 40 | 0.48 | 5.53 |
| Comparative Example 3 | 0.1 | 2.7 | 88 | 39 | 0.44 | 5.00 |
| Comparative Example 4 | 0.1 | 2.7 | 85 | 51 | 0.60 | 3.56 |

Difurfuryl ether: reagent manufactured by Wako Pure Chemical Industries, Ltd., molecular weight: 178, and ratio of a/(b + c + d) = 1/1.00
Furan resin 1: furfuryl alcohol/urea-formaldehyde resin (ratio by mole of furfuryl alcohol/formaldehyde/urea at the time of synthesis = 5.40/1.75/1.00)
After the furan resin 1 was synthesized, the ratio by weight of the resultant furan resin 1 to an unreacted fragment of furfuryl alcohol was 45/55.
Silane coupling agent: N-β(aminoethyl)γ-aminopropylmethyldimethoxysilane
[1] The content by percentage of furfuryl alcohol included that of an unreacted fragment of furfuryl alcohol that remained when the condensate (A) was synthesized, and that of an unreacted fragment of furfuryl alcohol that remained when the furan resin 1 was synthesized.
[2] The condensate 3 was not any condensate (A) used in the present invention since the ratio of a/(b + c + d) therein was 1/1.15.

As shown in Table 2, Examples 1 to 15 gave good results about each of the evaluation items. However, Comparative Examples 1 to 4 each gave a remarkably poorer result about at least one of the evaluation items than Examples 1 to 15. A comparison of Examples 1 and 5 with each other demonstrates that the addition of resorcin can make an improvement in both of the depths curability, and the mold strength.

The invention claimed is:

1. A binder composition for self-curing mold formation, comprising at least one condensate (A) selected from furfuryl alcohol condensate and furfuryl alcohol/formaldehyde condensate, and an acid-curable resin (B),
   wherein about the at least one condensate (A), the presence ratio by mole of its/their furan rings (a) to the total of its/their methylol groups (b), methylene groups (c) and oxymethylene groups (d), a:(b+c+d), is from 1:1.00 to 1:1.08,
   wherein the content by percentage of the at least one condensate (A) is from 1.0 to 4.5% by weight,
   wherein the content by percentage of nitrogen in the binder composition is from 0.8 to 3.5% by weight, and
   wherein the condensate (A) has a weight average molecular weight of 390 to 3,000.

2. The binder composition for self-curing mold formation according to claim 1, wherein about the at least one condensate (A), the presence ratio by mole of its/their furan rings (a) to the total of its/their methylol groups (b), methylene groups (c) and oxymethylene groups (d), a:(b+c+d), is 1:1.00.

3. The binder composition for self-curing mold formation according to claim 1, wherein the condensate (A) is a condensate yielded by causing formaldehyde and furfuryl alcohol to react with each other in the state that the ratio by mole of formaldehyde to furfuryl alcohol is from 0.00:1 to 0.08:1.

4. The binder composition for self-curing mold formation according to claim 1, wherein the condensate (A) is a condensate yielded by causing formaldehyde and furfuryl alcohol to react with each other in the state that the ratio by mole of formaldehyde to furfuryl alcohol is from 0.00:1 to 0.03:1.

5. The binder composition for self-curing mold formation according to claim 1, wherein the acid-curable resin (B) is one selected from the group consisting of furfuryl alcohol, condensates each made from furfuryl alcohol and an aldehyde, condensates each made from a phenolic compound and an aldehyde, condensates each made from melamine and an aldehyde, condensates each made from urea and an aldehyde and condensates each made from furfuryl alcohol, urea and an aldehyde.

6. The binder composition for self-curing mold formation according to claim 1, wherein the acid-curable resin (B) is one selected from the group consisting of furfuryl alcohol, and condensates each made from furfuryl alcohol, urea and an aldehyde.

7. The binder composition for self-curing mold formation according to claim 1, wherein the acid-curable resin (B) is one selected from the group consisting of furfuryl alcohol, and condensates each made from furfuryl alcohol, urea and formaldehyde.

8. The binder composition for self-curing mold formation according to claim 1, wherein the content by percentage of the acid-curable resin (B) is from 50 to 98% by weight.

9. The binder composition for self-curing mold formation according to claim 8, wherein the acid-curable resin (B) comprises furfuryl alcohol, and the content by percentage of furfuryl alcohol in the binder composition is from 50 to 98% by weight.

10. The binder composition for self-curing mold formation according to claim 1, further comprising resorcin.

11. The binder composition for self-curing mold formation according to claim 1, further comprising a silane coupling agent.

12. The binder composition for self-curing mold formation according to claim 1, wherein the content by percentage of nitrogen in the binder composition is from 1.8 to 3.5% by weight.

13. The binder composition for self-curing mold formation according to claim 1, which is used together with refractory particles, and a curing agent.

14. A method for producing a mold, comprising the step of curing a mixture of the binder composition for self-curing mold formation recited in claim 1, refractory particles, and a curing agent.

15. The method for producing a mold according to claim 14, wherein for 100 parts by weight of the refractory particles, the amount of the binder composition and that of the curing agent are from 0.5 to 1.5 parts by weight and from 0.07 to 1 part by weight, respectively.

16. The binder composition for self-curing mold formation according to claim 1, further comprising a nitrogen-containing compound selected from the group consisting of urea, melamine, a condensate made from urea and an aldehyde, a condensate made from melamine and an aldehyde, a urea resin, and a urea modified resin.

* * * * *